United States Patent
Choi et al.

(10) Patent No.: US 9,497,978 B2
(45) Date of Patent: Nov. 22, 2016

(54) APPARATUS FOR MAKING AND DISPENSING NITROGEN-CHARGED COFFEE

(71) Applicant: PARIS CROISSANT CO., LTD, Seongnam-si, Kyounggi-do (KR)

(72) Inventors: You Mei Choi, Seongnam-si (KR); Youg Jun Choi, Seoul (KR); Ki Chan Hyun, Seoul (KR); Hyo Min Kwon, Uiwang-si (KR)

(73) Assignee: PARIS CROISSANT CO., LTD, Seongnam-Si, Kyounggi-Do (KR)

( * ) Notice: Subject to any disclaimer, the term of this patent is extended or adjusted under 35 U.S.C. 154(b) by 0 days.

(21) Appl. No.: 15/158,753

(22) Filed: May 19, 2016

(65) Prior Publication Data

US 2016/0262417 A1 Sep. 15, 2016

Related U.S. Application Data

(62) Division of application No. 14/491,973, filed on Sep. 19, 2014, now Pat. No. 9,386,782.

(30) Foreign Application Priority Data

Jul. 10, 2014 (KR) .................. 10-2014-0086750

(51) Int. Cl.
*A47J 31/00* (2006.01)
*A23F 5/26* (2006.01)
*A47J 31/16* (2006.01)
*A47J 31/44* (2006.01)

(52) U.S. Cl.
CPC ............. *A23F 5/267* (2013.01); *A47J 31/002* (2013.01); *A47J 31/16* (2013.01); *A47J 31/44* (2013.01)

(58) Field of Classification Search
CPC ....... A23F 5/267; A47J 31/002; A47J 31/16; A47J 31/44
See application file for complete search history.

(56) References Cited

U.S. PATENT DOCUMENTS

| | | | |
|---|---|---|---|
| 2007/0128326 A1* | 6/2007 | Milo | A23F 5/243 426/594 |
| 2008/0148955 A1* | 6/2008 | Neace | A47J 31/002 99/279 |
| 2010/0278995 A1* | 11/2010 | Boehm | A23C 11/00 426/590 |
| 2014/0178559 A1* | 6/2014 | Neace, Jr. | A23F 5/26 426/594 |
| 2016/0007626 A1* | 1/2016 | Choi | A47J 31/002 426/433 |

OTHER PUBLICATIONS

Cold Brew. Wikipedia. Pulished Jun. 29, 2014.*
Kegco ICK19S-2 Dual Faucet Javarator Cold Brew Coffee Dispenser. Beveragefactory.com. Published Jun. 29, 2014.*

* cited by examiner

*Primary Examiner* — Anthony Weier
(74) *Attorney, Agent, or Firm* — Kile Park Reed & Houtteman PLLC

(57) ABSTRACT

A method of making coffee is provided. After a cold-brewed coffee is extracted from coffee beans, nitrogen gas is charged into the cold-brewed coffee. The cold-brewed coffee into which nitrogen gas is dissolved, is cooled to form a nitrogen-charged coffee. Therefore, the nitrogen-charged coffee may keep a rich density of foam and a flavor.

4 Claims, 3 Drawing Sheets

APPARATUS FOR MAKING AND DISPENSING NITROGEN-CHARGED COFFEE

CROSS-REFERENCE TO RELATED APPLICATIONS

This application is a divisional application of U.S. patent application Ser. No. 14/491,973, filed on Sep. 19, 2014, now U.S. Pat. No. 9,386,782, the disclosure of which is herein incorporated by reference in its entirety. The U.S. patent application Ser. No. 14/491,973 claims priority to Korean Application No. 10-2014-0086750 filed on Jul. 10, 2014, the entire contents of which are incorporated herein by reference.

BACKGROUND OF THE INVENTION

1. Field of the Invention

Example embodiments of the present invention relate to a method of making coffee and an apparatus of making coffee. More particularly, example embodiments of the present invention relate to a method of making coffee capable of keeping flavor at a relatively low temperature and an apparatus of making coffee realizing the method.

2. Description of the Related Art

Generally, one example of iced coffee is Iced Americano, which has been widely sold in coffee shops. The Iced Americano is made by diluting Espresso with water and ice, which is extracted from ground coffee using a relatively high pressure. However, the Iced Americano is made by adding cold water and ice to Espresso having a cream of minute foam and having velvety texture and a form layer, which may cause a temperature of Iced Americano lower to enhance bitter taste and to deteriorate texture dramatically by breaking the foam layer.

Thus, it has been required for iced coffee to keep a density of foam rich and maintain texture.

SUMMARY OF THE INVENTION

Example embodiments of the present invention provide a method of making a coffee capable of keeping a rich density of form and a flavor.

Example embodiments of the present invention provide an apparatus of making a coffee capable of keeping a rich density of form and a flavor.

According to one aspect of the present invention, there is provided a method of making coffee. After a cold-brewed coffee is extracted from coffee beans, nitrogen gas is charged into the cold-brewed coffee. The cold-brewed coffee into which nitrogen gas is dissolved, is cooled to form a nitrogen-charged coffee. Here, in order to extract the cold-brewed coffee form the coffee beans, the coffee beans is grinded to form a ground coffee. The ground coffee is steeped into water to form a mixture having the ground coffee and water. Then, after an extracted coffee is extracted from the mixture, the extracted coffee is diluted with water.

In an example embodiment, a concentration (TDS) of the cold-brewed coffee is in a range from about 1.36% to about 1.58%.

In an example embodiment, dispensing the nitrogen-charged coffee into a cup may be further performed. Here, in order to dispense the nitrogen-charged coffee into the cup, the nitrogen-charged coffee is discharged from a nozzle and then nitrogen gas is additionally discharged from the nozzle while discharging the nitrogen-charged coffee.

According to one aspect of the present invention, there is provided a An apparatus of making coffee. The apparatus includes a keg storing a cold-brewed coffee, a nitrogen tank containing nitrogen gas, the nitrogen tank being connected with keg by a first line to be configured to provide nitrogen gas with the keg to form a nitrogen-charged coffee, a discharging unit being connected with the keg by a second line to be configured to discharge the nitrogen-charged coffee, and a first cooling unit covering the second line to be configured to cool the nitrogen-charged coffee.

In an example embodiment of the present invention, the apparatus may further include a third line connecting the nitrogen tank with the discharge unit, the discharging unit may be configured to selectively open/close the second line and the third line to selectively discharge the nitrogen-charged coffee or to discharge the nitrogen-charged coffee and nitrogen gas at the same time.

In an example embodiment of the present invention, the apparatus may further include a second cooling unit receiving the keg, the second cooling unit being configured to cool the cold-brewed coffee in the keg.

In an example embodiment of the present invention, an internal pressure of nitrogen gas in the keg is in a range of about 6.0 bar to about 6.5 bar.

In an example embodiment of the present invention, the discharging unit includes a nozzle and a lever to be configure to selectively open/close the nozzle.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Figure 1:
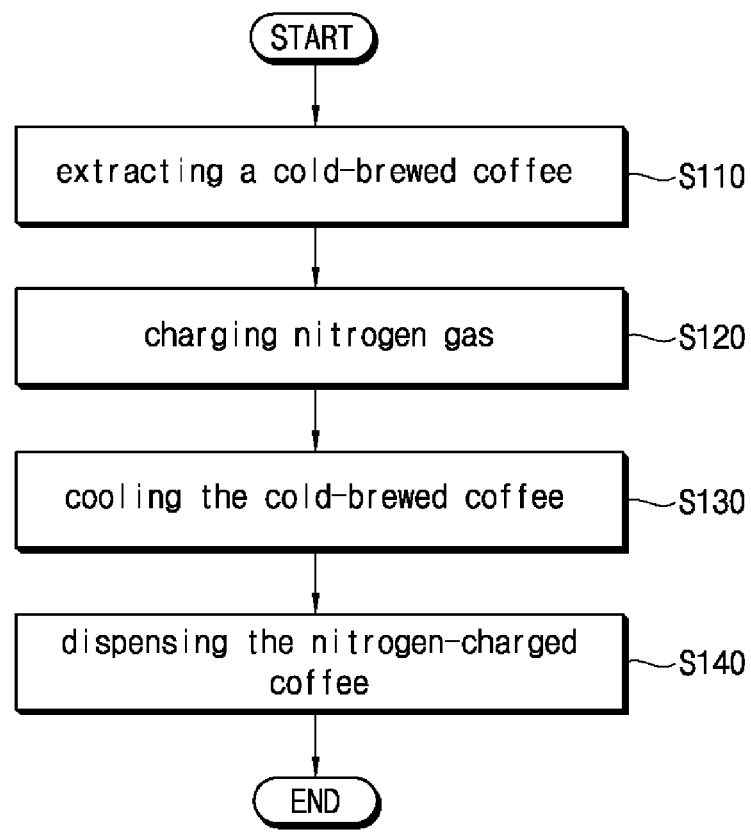
FIG. 1 is a flow chart illustrating a method of making coffee in accordance with an example embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of making coffee in accordance with an example embodiment of the present invention.

Referring to FIG. 1, a method of making coffee according to example embodiment of the present invention will be explained in detail.

At first, a cold-brewed coffee is extracted from coffee beans (step S110).

The cold-brewed coffee is formed by brewing the coffee beans in water, for example, a purified water at a relatively low temperature.

Figure 2:
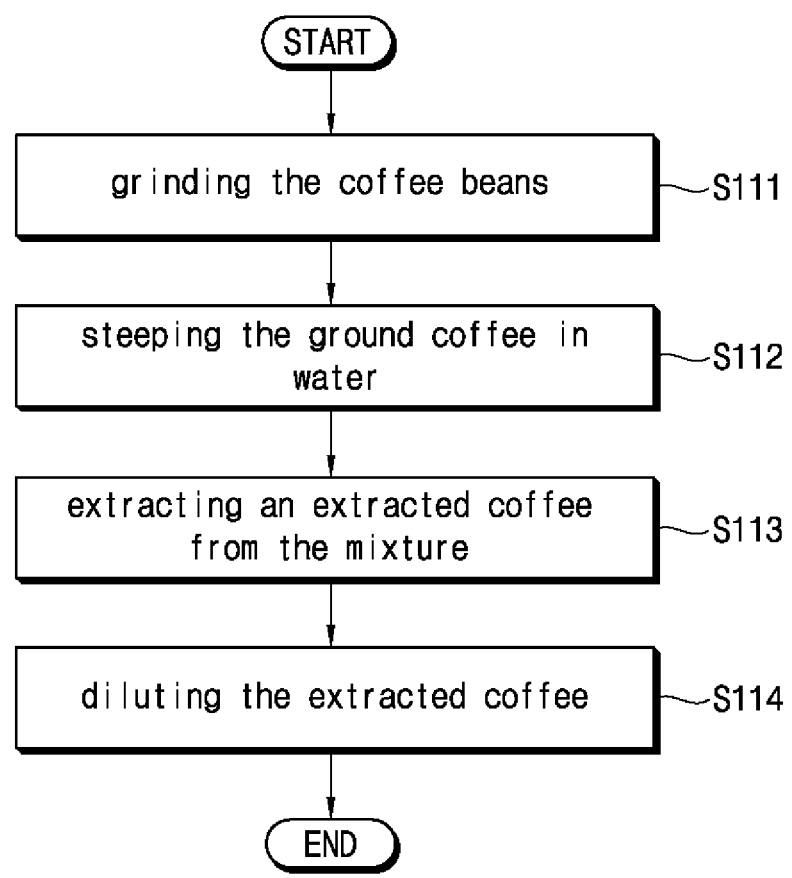
FIG. 2 is a flow chart illustrating a step of extracting a cold-brewed coffee in FIG. 1.

FIG. 2 is a flow chart illustrating a step of extracting a cold-brewed coffee in FIG. 1.

Referring to FIG. 2, the coffee beans is grinded under a pressure to form a ground coffee (step S111).

The ground coffee has powders each having an average grind size of about 800 μm to about 900 μm. More particular, the average grind size may be in a range of about 840 μm to about 860 μm. Preferably, the average diameter of the ground coffee is about 850 μm.

When the ground coffee has the powders each having an average grind size less than 800 μm, the ground coffee may be too over-extracted. Thus, the cold-brewed coffee may taste stale or bitter.

When the ground coffee has the powders each having an average diameter more than 900 μm, the ground coffee may be too under-extracted. Thus, the cold-brewed coffee may taste watery or plain.

Next, the ground coffee is steeped in water, for example, a purified water at a relatively low temperature (step S112). Thus, a mixture having the ground coffee and the water is formed.

A ratio of the ground coffee with respect to water may be in a range of about 180 g/L to about 195 g/L. Further, water may be controlled to have a temperature of about 10° C. to about 15° C. and a steeping time may be from about 12 hours to about 24 hours. The steeping time may be adjusted according to characteristics of the coffee beans, which may vary in accordance with each origin of the coffee beans, and a roasting degree of the coffee beans.

A range of water hardness is between about 100 ppm and about 200 ppm. When water have the water hardness of less than 100 ppm, the cold-brewed coffee may taste weak flavor, even though the cold-brewed coffee tastes mild and have an improved acidity.

When water have the water hardness of more than 200 ppm, the cold-brewed coffee may taste sharply bitter, stale such that the cold-brewed coffee may not be smooth.

Thus, when the water has the water hardness of between about 100 ppm and about 200 ppm, the cold-brewed coffee may have balanced taste of sweetness, acidity and bitterness.

When the ratio of the ground coffee with respect to water is less than 180 g/L or the steeping time is less than 12 hours, the ground coffee may be too under-extracted while brewing the ground coffee such that the cold-brewed coffee may taste watery or plain.

In contrast, when the ratio of the ground coffee with respect to water is more than 195 g/L or the steeping time is over 24 hours, the ground coffee may be over-extracted while brewing the ground coffee such that the cold-brewed coffee may taste stale or bitter.

An extracted coffee is extracted from the mixture having the ground coffee and water (step S113).

In particularly, the mixture passes through a filtering sheet to remove the ground coffee having a relatively large size from the mixture to form the extracted coffee.

The extracted coffee is diluted with water to form a cold-brewed coffee (step S114).

The extracted coffee is attenuated with water to form the cold-brewed coffee having a concentration suitable for drinking. A concentration of TDS in the cold-brewed coffee against water is in a range of about 1.36% to about 1.58%. The TSD is an abbreviation of total dissolved solids, which means a weight of the TSD in the cold-brewed coffee.

When the concentration of the cold-brewed coffee is less than 1.36%, the cold-brewed coffee may taste watery or plain. Further, the cold-brewed coffee may not have a balanced taste. In contrast, when the concentration of the cold-brewed coffee is more than 1.58%, the cold-brewed coffee may taste excessively bitter or have a taste too strong to drink.

Further, a volume ratio between the extracted coffee and water may be in a range of about 1:0.8 to about 1:1.2. Water may include heavy water having a water hardness of about 100 ppm to about 200 ppm.

When the volume ratio is less than about 1:0.8, an amount of water is too little, whereas the concentration of the cold-brewed coffee is too high. Thus, the cold-brewed coffee may taste too bitter or have a bad balanced taste too strong to drink.

When the volume ratio is more than about 1:0.2, an amount of water is too much, whereas the concentration of the cold-brewed coffee is too low. Thus, the cold-brewed coffee may taste watery or may not have a balanced taste.

Water is mixed to the extracted coffee to control an amount of the cold-brewed coffee easily. Thus, cost for making the cold-brewed coffee may decrease to improve an productivity of making the cold-brewed coffee. Further, the volume ratio between the extracted coffee and water may be easily adjusted to control the concentration of the cold-brewed coffee. So, a standard of taste related to the cold-brewed coffee may be established conveniently.

In another example embodiment, the extracted coffee may be utilized without diluting the extracted coffee with water. In other words, the concentration of the extracted coffee (TSD) may be adjusted in a range of about 1.36% to about 1.58% to omit a step of diluting the extracted coffee with water.

The cold-brewed coffee may be stored in a keg. The keg may be occupied with nitrogen gas. Thus, the cold-brewed coffee may be prevented from reacting with oxygen gas and from being oxidized.

The cold-brewed coffee may be stored at a temperature of about 1° C. to about 10° C.

When the cold-brewed coffee is stored at a temperature of less than 1° C., the cold-brewed coffee may be frozen. Further, when the cold brewed coffee is stored at a temperature of more than 10° C., the cold-brewed coffee may be lukewarm to a mouth or may have a degraded refreshing taste.

Referring to FIG. 1 again, nitrogen gas is charged into the cold-brewed coffee (step S120).

In particular, nitrogen gas is bubbled in the cold-brewed coffee stored in the keg to charge nitrogen gas into the cold-brewed coffee. In order to perform charging nitrogen gas into the cold-brewed coffee efficiently, nitrogen gas may be repeatedly provided into the cold-brewed coffee. For example, nitrogen gas may charged into the cold-brewed coffee two times. Further, a pressure of nitrogen gas is in a range of about 6.0 bar to about 6.5 bar in the keg.

When the pressure of nitrogen gas is less than about 6.0 bar, the pressure of nitrogen gas is too low to charge nitrogen gas into the cold-brewed coffee sufficiently. Thus, the nitrogen charged coffee to be formed by charging nitrogen gas into the cold-brewed coffee, may not generate micro-sized foams. In the meantime, when the pressure of nitrogen gas is more than about 6.5 bar, the pressure of nitrogen gas is too high, which may cause a nitrogen-providing unit malfunctioned.

Next, the cold-brewed coffee in which nitrogen gas is dissolved, is cooled to form a nitrogen-charged coffee. Nitrogen gas is provided in the keg to increase a pressure of nitrogen gas in the keg to supply the cold-brewed coffee into a discharging unit.

While the cold-brewed coffee is drained out from the keg to the discharging unit, the cold-brewed coffee in which nitrogen gas is dissolved may be cooled to have a predetermined temperature. For example, the predetermined temperature is from about 1° C. to about 10° C. More particularly, the temperature is in a range of about 3° C. to about 6° C. More preferably, the temperature is about 4° C.

When the temperature is less than 1° C., the cold-brewed coffee in which nitrogen gas is dissolved may be frozen. Meanwhile, when the temperature is more than 10° C., the cold-brewed coffee in which nitrogen gas is dissolved may be lukewarm in a mouth or may have a degraded refreshing taste. Thus, the cold-brewed coffee in which nitrogen gas is dissolved, may have a rich flavor, a good density of foam, a balanced taste, a good texture, etc.

The nitrogen-charged coffee is discharged into a cup (step S140).

The nitrogen-charged coffee is discharged from a nozzle into the cup. When the nitrogen-charged coffee is discharged from the nozzle, micro-sized foams may generated at a surface of the nitrogen-charged coffee due to nitrogen gas. The micro-sized foams may form a foam layer on the surface of the nitrogen-charged coffee. The foam layer may be maintained on the surface for a period of time to cover the nitrogen-charged coffee. Thus, the nitrogen-charged coffee may maintain a smooth and rich texture, a concentration of foam and a flavor until the nitrogen-charged coffee is drunken up.

In example embodiment of the present invention, after partially filling the cup with the nitrogen-charged coffee, the nitrogen-charged coffee and nitrogen gas may be discharged simultaneously from the nozzle to fill the cup additionally. Thus, the nitrogen-charged coffee dispensed into the cup may have rich foam on a top thereof. As a result, the nitrogen-charged coffee have the foam layer thick. Here, a volume of the nitrogen-charged coffee which firstly fills the cup, is defined as a first volume. Further, a volume of the nitrogen-charged coffee and nitrogen gas which are discharged simultaneously from the nozzle, is defined as a second volume.

A volume ratio of the first volume with respect to an overall volume of the nitrogen-charged coffee in the cup, may be in a range of about 60% to about 80%.

When the volume ratio is less than about 60%, the second volume may be excessively high. Thus, the foam layer may be too thick, which may cause inconvenience that coffee-drinker's mouth is smeared with foam of the nitrogen-charged coffee.

When the volume ratio is more than about 80%, the first volume may be excessively high. Thus, the foam layer formed around a upper surface of the nitrogen-charged coffee may be too thin.

Figure 3:
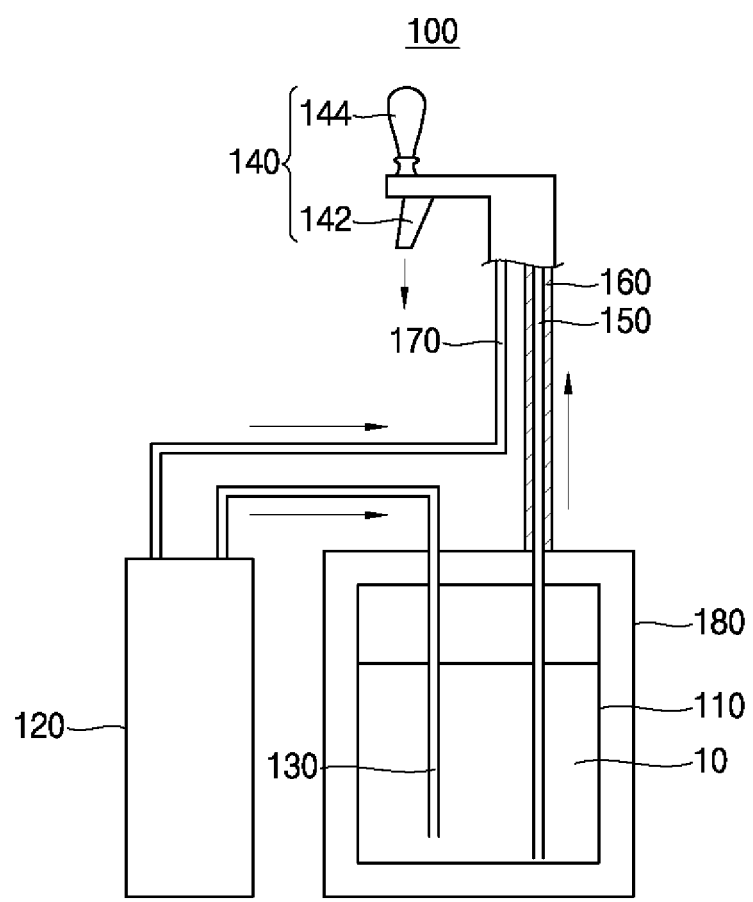
FIG. 3 is a cross-sectional view illustrating an apparatus of making coffee in accordance with an example embodiment of the present invention.

FIG. 3 is a cross-sectional view illustrating an apparatus of making coffee in accordance with an example embodiment of the present invention.

Referring to FIG. 3, an apparatus 100 of making coffee in accordance with an example embodiment of the present invention includes a keg 110, a nitrogen tank 120, a first line 130, a discharging unit 140, a second line 150, a first cooling unit 160, a third line 170 and a second cooling unit 180.

The keg 110 stores a coffee 10 therein. The keg 110 is filled with nitrogen gas. Thus, the cold-brewed coffee 10 may be prevented from being reacted with oxygen and being oxidized.

The coffee 10 may include a cold-brewed coffee. For example, the coffee 10 may include the cold-brewed coffee made by a method of making the cold-brewed coffee explained with FIG. 2

The nitrogen tank 120 stores nitrogen gas therein. The nitrogen tank 120 is connected to the keg 110 by the first line 130. The first line 130 may extend such that a end portion of the first line 130 is dipped into the coffee 10 of the keg 110.

Nitrogen gas is provided from the nitrogen tank 120 into the keg 110 through the first line 130. In particular, nitrogen gas is bubbled in the coffee 10 to be dissolved in the coffee 10. Thus, a nitrogen-charged coffee may be formed in the keg 110. In order to efficiently dissolve nitrogen gas in the coffee 10, nitrogen gas may be repeatedly provided into the coffee 10. For example, nitrogen gas is provided into the coffee 10 two times.

The nitrogen tank 120 may keep an internal pressure of nitrogen gas between about 6.0 bar to about 6.5 bar.

When the internal pressure is less than about 6.0 bar, nitrogen gas may not be efficiently dissolved in the coffee 10 such that micro-sized foam may not occur to the coffee 10. when the internal pressure is more than about 6.5 bar, the pressure of nitrogen gas is too high, which may cause the nitrogen tank 120 or the first line 130 malfunctioned.

The discharging unit 140 is configured to discharge the nitrogen-charged coffee. The discharging unit 140 may include a nozzle 142 and a lever 144. The lever 144 may selectively open/close the nozzle 142 to determine whether the nitrogen-charged coffee is discharged or not. The nozzle 142 may be a passway by which the nitrogen-charged coffee is discharged. Alternatively, the lever 144 may selectively open/close the second line 150 to determine whether the nitrogen-charged coffee is discharged or not.

The discharging unit 140 is connected with the keg 110 by the second line 150. The second line 150 may extend such that a end portion of the second line 150 is dipped into a low portion of the keg 110.

Due to the internal pressure of nitrogen gas in the keg 110, the nitrogen-charged coffee may flow to the discharging unit 140 by the second line 150.

The first cooling unit 160 surrounds the second line 150. The first cooling unit 160 may circulate cooling water along the second line 150 to cool the nitrogen-charged coffee which flows through the second line 150. Thus, the nitrogen-charged coffee may be supplied into the discharging unit 140 with keeping a temperature of the nitrogen-charged coffee constant.

Even thought not shown in FIG. 3, the first cooling unit 160 may include a circulating line serving as a passway for cooling water, pump for circulating cooling water and a chiller for chilling cooling water to cool the nitrogen-charged coffee at a predetermined temperature.

For example, the predetermined temperature is from about 1° C. to about 10° C. More particularly, the temperature is in a range of about 3° C. to about 6° C. More preferably, the temperature is about 4° C.

When the first cooling unit 160 may cool the nitrogen-charged coffee having a temperature of less than 1° C., the nitrogen-charged coffee may be frozen to plug the second line 150. Meanwhile, when the first cooling unit 160 may cool the nitrogen-charged coffee having a temperature of more than 10° C., the nitrogen-charged coffee may be lukewarm in a mouth or may have a degraded refreshing taste. Thus, the nitrogen-charged coffee may have a rich flavor, a good density, a good acidity, a good texture, etc.

In some example embodiments of the present invention, the apparatus 100 further includes a third line 170. The third line 170 may connect the nitrogen tank 120 to the discharging unit 140. In particular, the third line 170 may connect the nitrogen tank 120 to the nozzle 142 of the discharging unit 140. The nozzle 142 may be a passway by which nitrogen gas is discharged. The lever 144 may selectively open/close the second line 150 and the third line 170 to determine whether the nitrogen-charged coffee is discharged and whether nitrogen gas is discharged. Thus, the discharging unit 140 may dispense only the nitrogen-charged coffee or dispense both the nitrogen-charged coffee and nitrogen coffee simultaneously through the nozzle 142, depending on an operation of the lever 144

When the lever 144 is positioned at a center, the second line 150 and the third line 170 is kept to be close. When the lever 144 is pulled forwardly, the third line 170 is kept to be close and the second line 150 changes to be open such that the nitrogen-charged coffee is discharged from the nozzle 142 through the second line 150. When the lever 144 is pushed backwardly, both the third line 170 and the second line 150 change to be open such that the nitrogen-charged coffee and nitrogen gas are simultaneously discharged from the nozzle 142 through the second line 150 and the third line 170, respectively.

When the nitrogen-charged coffee is discharged from the nozzle 142 to be provided into a cup, micro-sized foam may be formed on an upper surface of the nitrogen-charged coffee due to nitrogen gas which is dissolved in the nitrogen-charged coffee. Thus, the foam layer is formed on the upper surface of the nitrogen-charged coffee.

When the nitrogen-charged coffee and nitrogen gas are simultaneously discharged from the nozzle 142, micro-sized foam may be affluently formed on an upper surface of the nitrogen-charged coffee due to both nitrogen gas which is dissolved in the nitrogen-charged coffee and nitrogen gas additionally discharged from the nozzle 142. Thus, the foam layer becoming thicker is formed on the upper surface of the nitrogen-charged coffee.

When the nitrogen-charged coffee and nitrogen gas are simultaneously discharged from the nozzle 142, the foam layer may be excessively thick on the upper surface of the nitrogen-charged coffee. Thus, it may be necessary to adjust a ratio between a volume of the nitrogen-charged coffee which is supplied only through the second line 150 and a volume of nitrogen gas and a volume of the nitrogen-charged coffee and nitrogen gas which are simultaneously discharged from the nozzle 142 in order to control a thickness of the foam layer.

The foam layer may be maintained on the surface for a period of time to cover the nitrogen-charged coffee. Thus, the nitrogen-charged coffee may keep a smooth texture, a concentration and a flavor until the nitrogen-charged coffee is drunken up.

Even thought not shown in FIG. 3, the first line 130, the second line 150 and the third line 170 may include valves, respectively. The first line 130, the second line 150 and the third line 170 may be selectively open/close depending on an operation of the valves.

The second cooling unit 180 is configured to receive the keg 110. The second cooling unit 180 cools the nitrogen-charged coffee stored in the keg 110. The second cooling unit 180 may include a refrigerator.

The second cooling unit 180 may chill the nitrogen-charged coffee having a temperature, as the first cooling unit 160 does. The second cooling unit 180 may chill the nitrogen-charged coffee having a temperature from about 1° C. to about 10° C.

When an excessively large amount of the nitrogen-charged coffee is discharged from the discharging unit 140, the first cooling unit 160 may not be capable of cooling the nitrogen-charged coffee efficiently. Thus, the second cooling unit 180 may chill the nitrogen-charged coffee before providing nitrogen-charged coffee into the discharging unit 140 in order to assist the first cooling unit 160. Thus, even though an large amount of the nitrogen-charged coffee is discharged from the discharging unit 140, the nitrogen-charged coffee may be discharged under a cooled status. As a result, the nitrogen-charged coffee may be prevented from being lukewarm in a mouth or degrading a refreshing taste.

According to example embodiments of the present invention, nitrogen gas is bubbled in a cold-brewed coffee to form a nitrogen-charged coffee, After discharging the nitrogen-charged coffee, a foam layer having a thickness may be formed on an upper surface of the nitrogen-charged coffee and the foam layer may be maintained for a period of time. Thus, the nitrogen-charged coffee may keep a smooth texture, a concentration and a flavor until the nitrogen-charged coffee is drunken up.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An apparatus of making coffee comprising:
   a keg storing a cold-brewed coffee;
   a nitrogen tank containing nitrogen gas, the nitrogen tank being connected with keg by a first line to be configured to provide nitrogen gas with the keg to form a nitrogen-charged coffee;
   a discharging unit being connected with the keg by a second line to be configured to discharge the nitrogen-charged coffee;
   a first cooling unit covering the second line to be configured to cool the nitrogen-charged coffee; and
   a third line connecting the nitrogen tank with the discharge unit;
   wherein the discharging unit is configured to selectively open/close the second line and the third line to selectively discharge the nitrogen-charged coffee or to discharge the nitrogen-charged coffee and nitrogen gas at the same time.

2. The apparatus of making coffee of claim 1, further comprising a second cooling unit receiving the keg, the second cooling unit being configured to cool the cold-brewed coffee in the keg.

3. The apparatus of making coffee of claim 1, wherein an internal pressure of nitrogen gas in the keg is in a range of about 6.0 bar to about 6.5 bar.

4. The apparatus of making coffee of claim 1, wherein the discharging unit includes a nozzle and a lever to be configure to selectively open/close the nozzle.

* * * * *